June 29, 1926.

G. J. BURNS ET AL 1,590,885

PROCESS FOR RECOVERING AND PURIFYING WASTE GASES AND APPARATUS THEREFOR

Filed Nov. 10, 1923   6 Sheets-Sheet 1

Fig. 1.

George J. Burns,
John E. Best,
Inventors

Witnesses:

June 29, 1926.  
G. J. BURNS ET AL  
1,590,885  
PROCESS FOR RECOVERING AND PURIFYING WASTE GASES AND APPARATUS THEREFOR  
Filed Nov. 10, 1923   6 Sheets-Sheet 6

George J. Burns,
John I. Best,
Inventors

Witnesses:

Patented June 29, 1926.

1,590,885

UNITED STATES PATENT OFFICE.

GEORGE J. BURNS, OF YOUNGSTOWN, OHIO, AND JOHN E. BEST, OF GRAND RAPIDS, MICHIGAN; SAID BEST ASSIGNOR OF ONE-FOURTH OF THE WHOLE RIGHT TO WANDA FRENCH, OF CLEVELAND, OHIO.

PROCESS FOR RECOVERING AND PURIFYING WASTE GASES AND APPARATUS THEREFOR.

Application filed November 10, 1923. Serial No. 673,964.

This invention relates to a new method and apparatus or device therefor for the treatment of waste gases to effect a separation of the finely divided solids suspended therein, and to cause a recovery of the normally liquid constituents which are contained or form a part of the said gases, and simultaneously eliminate all the noxious and poisonous concomitants from these waste gases. The waste gases are those gases which are allowed to escape into the atmosphere and which usually result from the combustion of any carbonaceous fuel, liquid or solid, for example, petroleum oils, naphthalene, gasolene, coal, coke, lignite, peat, and the like, used as a medium for generating energy to be expended in various ways, such as heating blast furnaces, producing electrical energy, generating steam for driving locomotives, driving the motors in automobiles, tractors, and the like. These so-called waste gases contain free carbon, carbon monoxide gas, carbon dioxide gas, hydrogen, and methane, together with other suspended undecomposed and unburned hydrocarbons; and on being allowed to escape into the atmosphere are not only a source of a great industrial waste, but also a great annoyance and detriment to the public health, due to the noxious and poisonous gases which they contain. This great waste with its attendant detriment to public health is most pronounced in the case of internal combustion engines, particularly the automobile, which appears in such great numbers upon the streets of our many cities and towns. Since the exhaust gases emitted from the exhaust of the automobiles has become such a menace, our invention has especial reference to the treatment of the waste gases coming from this source, one of its objects being to cause a separation of the finely divided carbon suspended therein, and to effect a purification of these exhaust gases, as well as a recovery of the high boiling heavy fractions and the low boiling light fractions of hydrocarbons that remain suspended and undecomposed in these gases.

Another object of our invention is to recover these hydrocarbons that are undecomposed and suspended in these waste gases in such a manner by means of our device that the high boiling, heavier fractions are recovered in such form as to be capable of being run directly into the crank case of the motor for use as a lubricant for same, and the low boiling lighter hydrocarbons are of such volatility and character as to be capable of being run directly into the suction pipe of the carburetor to be intermixed with the incoming gasoline, thereby enriching the explosive mixture and materially reducing the amount of gasoline to be used.

A further object of this invention is to purify the exhaust gases so that they can be run directly into the manifold, thereby effecting a more perfect combustion.

Another object of our invention is to eliminate all the noxious and poisonous concomitants from the portion of the waste gases which is discharged into the atmosphere.

Due to the variations in the purity of the motor fuel and the complexity of setting the adjustments on the carburetor for controlling the fuel feed with respect to the requisite amount of air, imperfect mixtures of the liquid fuel and air result which, when combusted, are incomplete in that the exhaust gases contain large quantities of unburned fuel together with such poisonous gases as carbon monoxide, hydrogen methane gas, and the like. We have found after extensive investigations that this great waste of fuel with its attendant detriment to the public health can be entirely obviated by the use of our recovery and purifying device. By passing the exhaust gases through our device we effect the recovery of the unburned and undecomposed hydrocarbons that have not been burned and simultaneously purify the normally gaseous elements of these exhaust gases.

This device is not only capable of use in connection with internal combustion engines, such as the automobile, tractors, and the like, but it will effect the same efficient results in recovering many valuable products contained in any waste gases in the varied industries where waste gases are emitted, the character of the materials recovered varying, of course, with the particular source of waste gases.

This invention comprises a recovery and purifying tower consisting of several chambers superimposed one upon the other, the bottom and top chambers of the series being of larger diameter than the chamber interposed therebetween, with suitable connections for setting up communication between the respective chambers in combination with a suitable coupling and fume arresting device for joining the exhaust pipe with the recovery and purifying tower.

The invention further consists in the peculiar construction of the recovery and purifying tower by which the high boiling heavier fractions of hydrocarbons are run directly into the crank case of the motor, and the low boiling lighter fractions of hydrocarbons are run directly into a small chamber where this fraction is condensed and collected to be subsequently used with the incoming motor fuel; and further in the construction, arrangement, and combination of the various parts as more fully hereinafter described, and particularly pointed out in the claims.

In the accompanying drawings we have illustrated certain embodiments of our invention, but the same are to be understood as being illustrative only, and not as defining, the limits of the invention.

Fig. 14 is a sectional elevation showing the arrangement of the absorption chamber about the blow-off valve attached to the top of the recovery tower.

In the drawings, 1 represents a fume arrestor connected to the inlet 5 of the base of the recovery tower 3. The fume arrester 1 is surrounded by a cylindrical chamber 6, the cylindrical chamber 6 being rigidly attached to the bottom of chamber 3 by suitable bolts 7.

The fume arrestor 1 comprises two vertical tubes 8 and 9 having perforated sides 10, the tube 8 being smaller in diameter than the tube 9, the latter tube having a closed top 11. The smaller tube 8 is surrounded by the larger tube 9 in such manner as to form a plurality of annular chambers. In the top of the fume arrestor 1, at a point adjacent the inlet 5, is a screen 12. Surrounding the top of the fume arrestor 1 at a point directly adjacent the inlet 5 is a chamber 13 provided with a plurality of slots 14 in its sides thereof. At the bottom of the fume arrestor at a point adjacent the inner tube 8 is an inlet pipe 16 cast or made integral with the fume arrestor 1. This pipe 16 is surrounded with a hexagonal nut 17 cast or made a permanent part thereof. The purpose of this construction is to allow the screen to be cleaned by turning the fume arrestor around to bring the openings in the opposite sides of the chamber 13 in registry, so that a brush may be used for insertion through the openings in the cleaning of the screen. This can be accomplished by applying a wrench to the hexagonal nut 17 and giving it a quarter turn. These openings are normally out of registry in the use of the device.

The chamber 6 provides for an inlet pipe 19 inserted in the opening 20 at its top left side and for an outlet pipe 21 on its lower right side.

Above the inlet 5 and in close proximity thereto, is a fan 22 rotatably mounted in the floor 4 of the lower sectional chamber 23, the mounting being such that the incoming gases impinge upon the blades and cause a rapid rotation of the fan. Surrounding the upper part of the chamber 23 is another chamber 24. Extending partly within and protruding vertically upward from the chamber 23 is a superimposed chamber 26. The chamber 26 is divided into a base chamber 27 and an intermediate chamber 28, and a top chamber 29. The intermediate chamber 28 has an inclined or sloping bottom 30, and a conical top 31, in which are mounted a number of baffles of umbrella shape 32. Surrounding a substantial part of the chamber 29 and extending vertically upward is the chamber 37. The top wall 33 of the main chamber 26 receives the lower funnel shaped end 49 of a distributor head 34. The distributer head 34 consists of upper and lower diverging sections 36 and 35, respectively, the lower section 35 being enclosed within the chamber 37, and the upper section 36 being without the chamber 37. Connected to and extending from the top part 36 of the distributer head 34 is a blow-off valve 38 of the well known conventional type. Surrounding the blow-off valve 38 and extending vertically upward is an absorption chamber 60 having an outlet 63 in its top side. Within the absorption chamber 60 are a plurality of perforated screens or shelves 61 for the reception of a granular absorbent material 62, such as activated charcoal, or specially prepared aluminium oxide, each screen or shelf 61 being disposed in a vertical line and equally spaced apart. The base of the blow-off valve 38 is threaded as is the lower internal part of the chamber 60, as shown in Fig. 14, so that in mounting the chamber 60 it is only necessary to screw the said chamber to the base of the blow-off valve. This construction enables the absorption tower to be readily and easily removed for re-activating the absorbent material contained within. Attaching this absorption tower to any source of superheated steam will relieve the absorbent material of these gases and at the same time re-activate it for further use.

Figure 1:
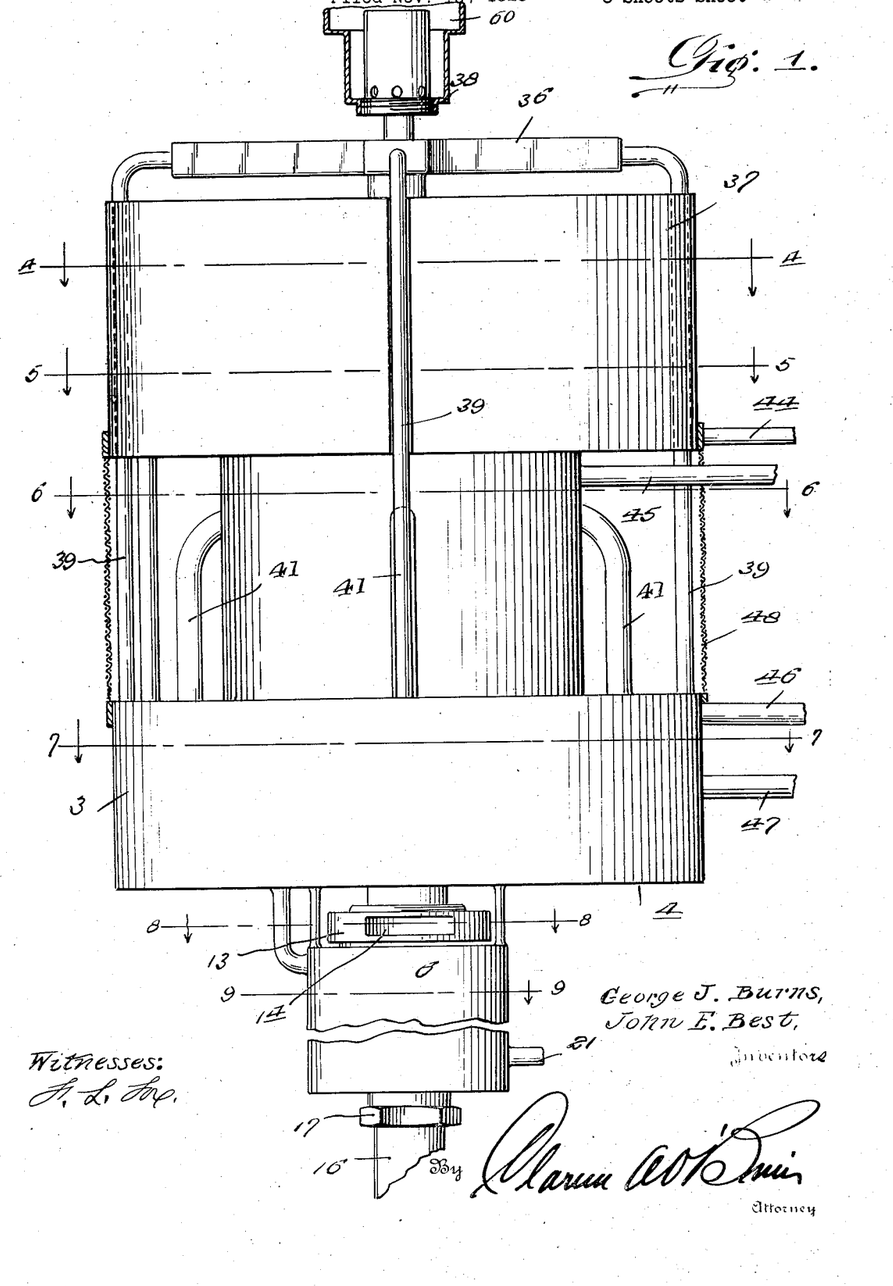
Fig. 1 is a side elevation of our device.
Figures 1, 2:
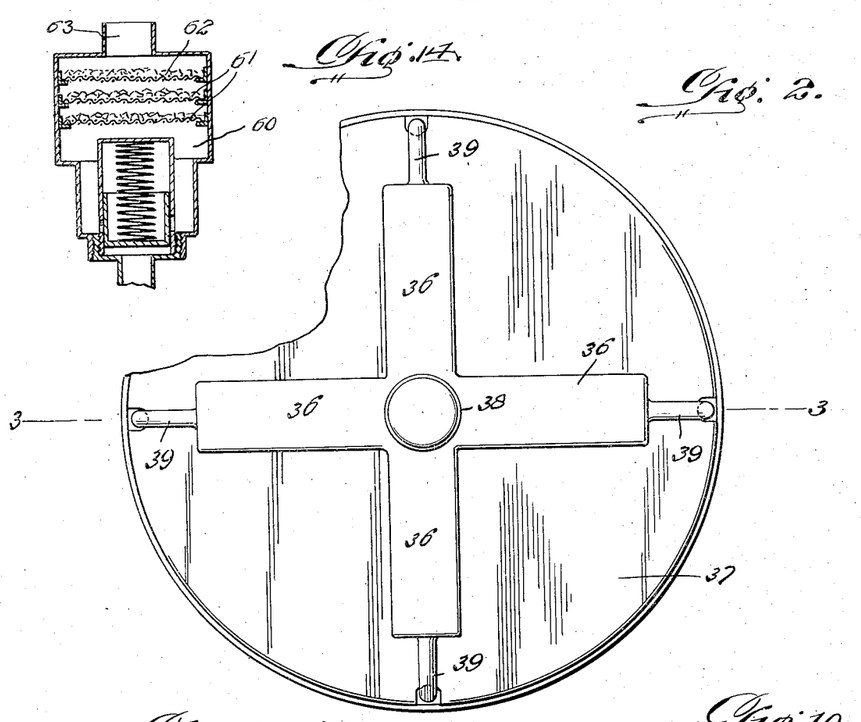
Fig. 2 is a plan view of our device.
Figure 10:
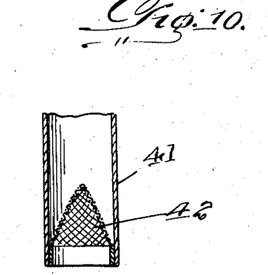
Fig. 10 is an enlarged vertical section showing the arrangement of the conical screen at the end of the U-shaped pipes.

The top portion 36 of the distributer head 34 comprises four branches as clearly shown in Fig. 2. Communication is set up between these branches of the top portion 36 with the chamber 24 by the pipes 39. Communication is in turn set up between the chamber 37 and the chamber 27 by the pipe 40. The U-shaped tubes 41 being four in number (Fig. 6) set up communication between the chamber 23 and the chamber 28. These U-shaped tubes 41 are equipped at their ends within the chamber 28 with conical shaped screens 42 as shown in enlargement in Fig. 10.

The pipe 19 extends through the bottom 4 of the recovery tower 3 and is received in the opening 42 in the floor 43 of the chamber 27. The pipe 44 is the inlet for the gasoline flowing into the chamber 37. Pipe 45 is the outlet for the partially condensed and uncondensed low boiling light hydrocarbons recovered from the exhaust gases. Pipe 46 is the outlet for the high boiling heavy fractions recovered from the exhaust gases. Pipe 47 is the outlet for the gases emitted from the exhaust that have been purified.

At a point adjacent the recovery tower 3 and in communication with the pipe 45, is a condensing and collection chamber 65 for the collection of the low boiling light hydrocarbon liquid. The top of the collection chamber 65 is provided with a conical shaped outlet 67 adapted to receive at its farthest remote end from the top of the chamber 65 the pipe 66. Within the conical outlet 67 at a point in close proximity to the top of the chamber 65 is a conical shaped screen 68. Communication is set up between the collection chamber 65 and the outlet pipe 47 for the purified exhaust gases by means of the bent tube 64.

Surrounding that portion of the recovery device extending from the top of the chamber 24 to the bottom of chamber 37 is a screen 48 to prevent dirt and dust from surrounding the U-shaped pipes 41, and pipes 39 and 40, respectively.

Figure 3:
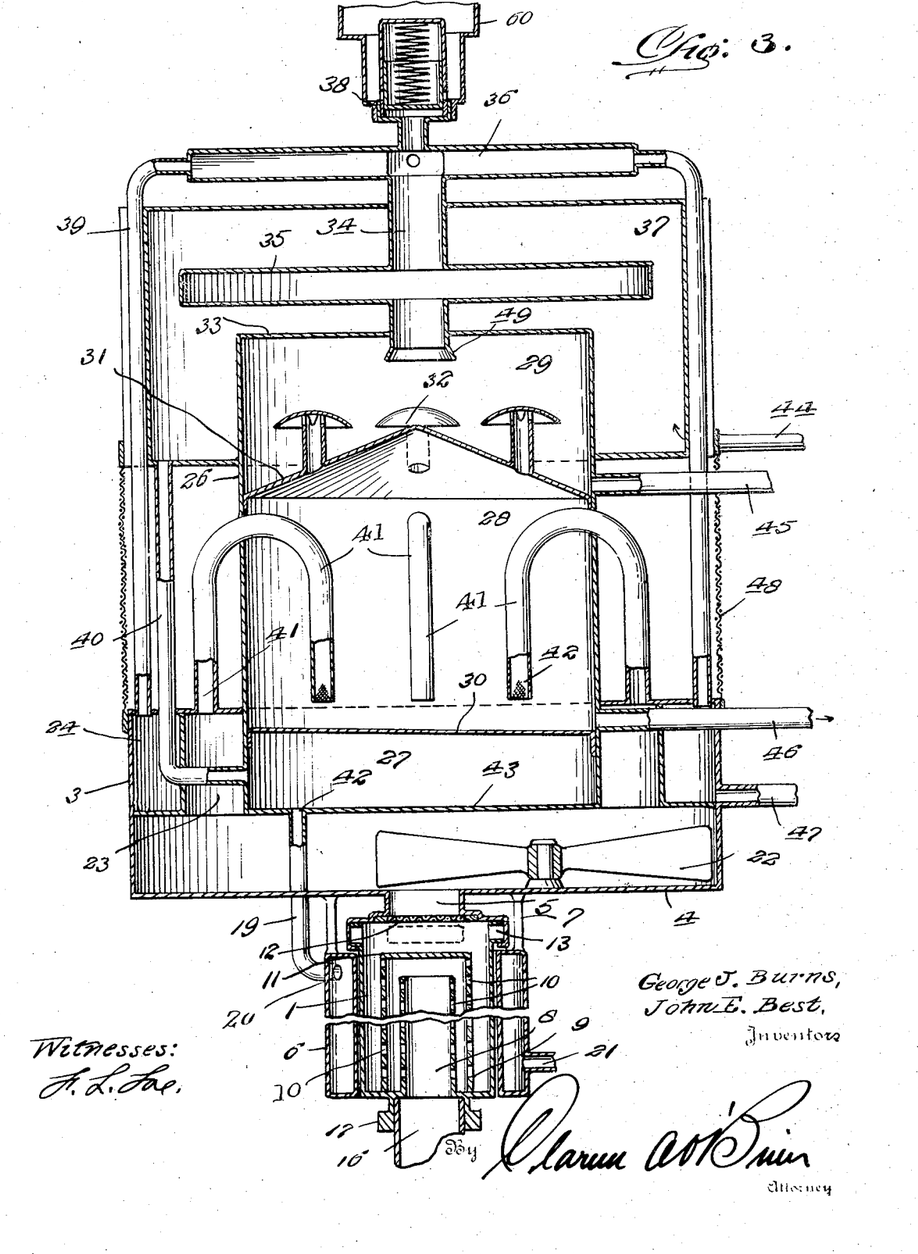
Fig. 3 represents a longitudinal section through the device.
Figures 6, 9, 13:
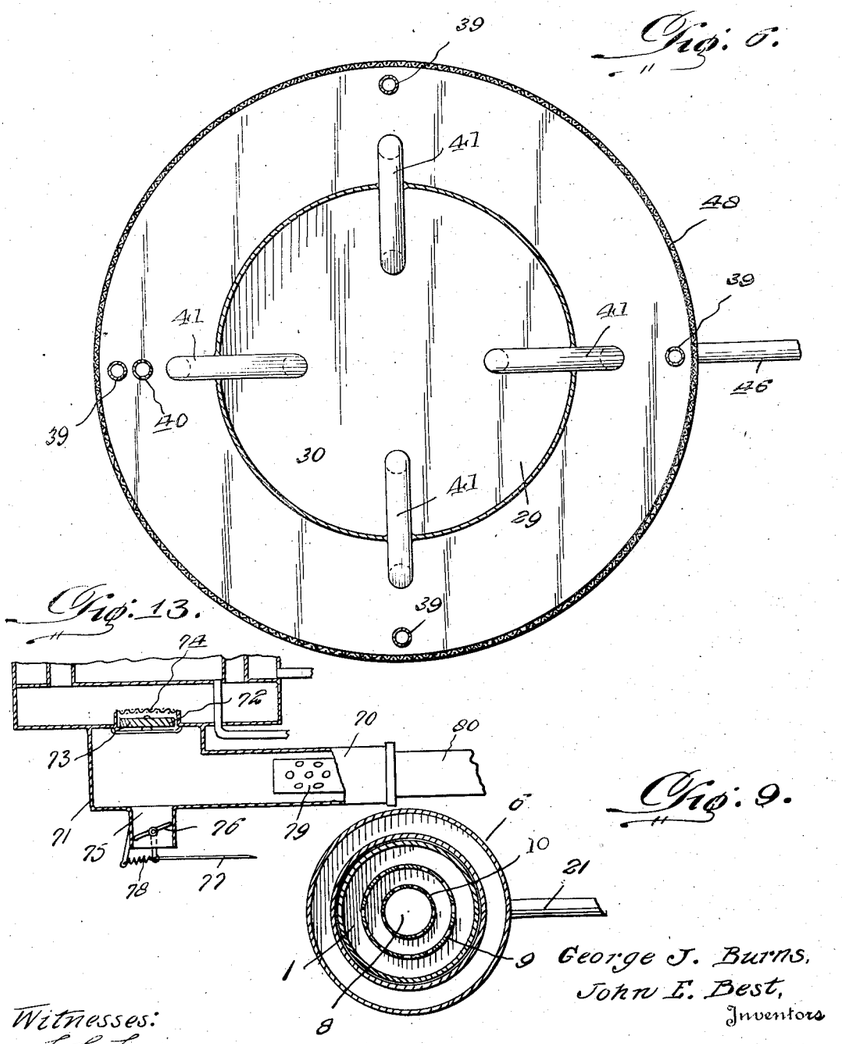
Fig. 6 is a sectional plan view taken on the line 6—6 of Fig. 1.
Fig. 9 is a sectional plan view taken on the line 9—9 of Fig. 1.
Fig. 13 is a sectional elevation on a reduced scale showing a modification of the fume arrester attached to the recovery tower shown in Fig. 3.

Fig. 13 shows a modification of a fume arrestor that may be substituted for the fume arrestor 1 shown in Fig. 3. This fume arrestor comprises a horizontal tube 70 with a right angular bend 71 at its end adjacent the recovery tower 3. This right angular bend 71 is joined to and made integral with the recovery tower 3. Within the floor 4 of the lower sectional chamber 23 of the recovery tower 3 is an inlet 72 for setting up communication between the tube 70 and the recovery tower 3. Within the inlet 72 is mounted a fan 73. Above and bridging the inlet opening 72 is a screen 74. Within the tube or shell 70 at a point adjacent the inlet pipe 80 is a perforated tube 79. In the bottom of the tube 70 at a point directly in line with the inlet 72 is an outlet 75 provided with a spring valve 76 of the conventional type. By compressing the lever 77 the valve opens allowing the carbon deposited to fall out, and upon releasing the lever 77 the valve 76 returns to its closed position shown in Fig. 13 by the action of the spring 78.

Figures 7, 11:
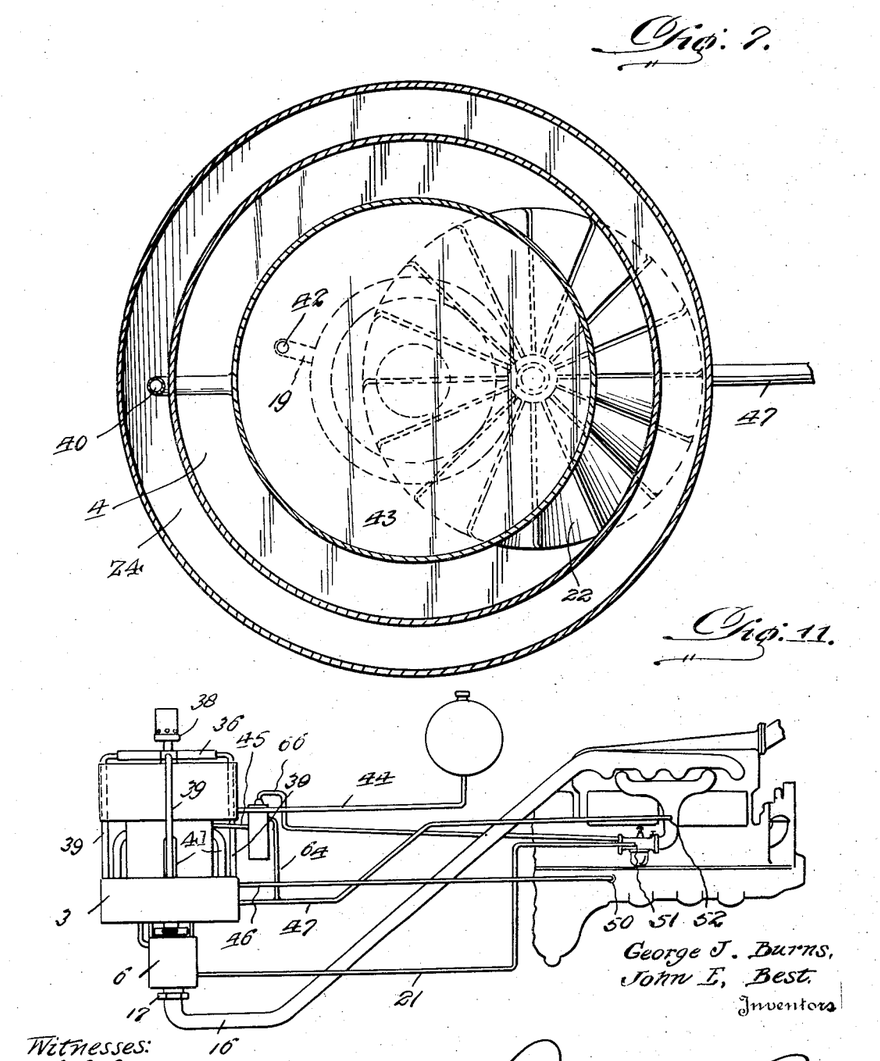
Fig. 7 is a sectional plan view taken on the line 7—7 of Fig. 1.
Fig. 11 is a side elevation showing the device connected to a Ford motor.
Figure 8:
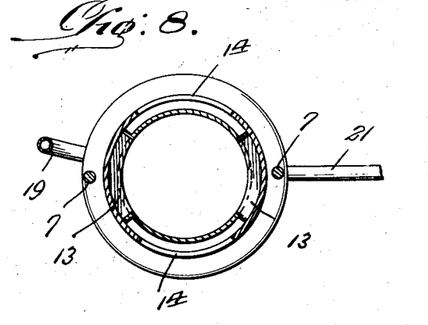
Fig. 8 is a sectional plan view taken on the line 8—8 of Fig. 1.

The operation of the device is as follows:

The exhaust gases enter the fume arrestor 1 through the inlet 16, pass through the perforations 10, through the screen 12, and then enter the chamber 23 and impinging upon the blades of the fan 22, cause a rapid rotation of same and producing a centrifugal action on the gases for circulating them, in oder to effect a more rapid cooling thereof. The gases then pass through the U-shaped tubes 41 into the chamber 28 where the high boiling heavy hydrocarbon liquid collects upon the inclined floor 30 and flows through the outlet pipe 46 to the crank case 50 (Fig. 11). This liquid is of a dark black color, and has the consistency and appearance of lubricating oil known as 600 W.

Figures 4, 5, 12:
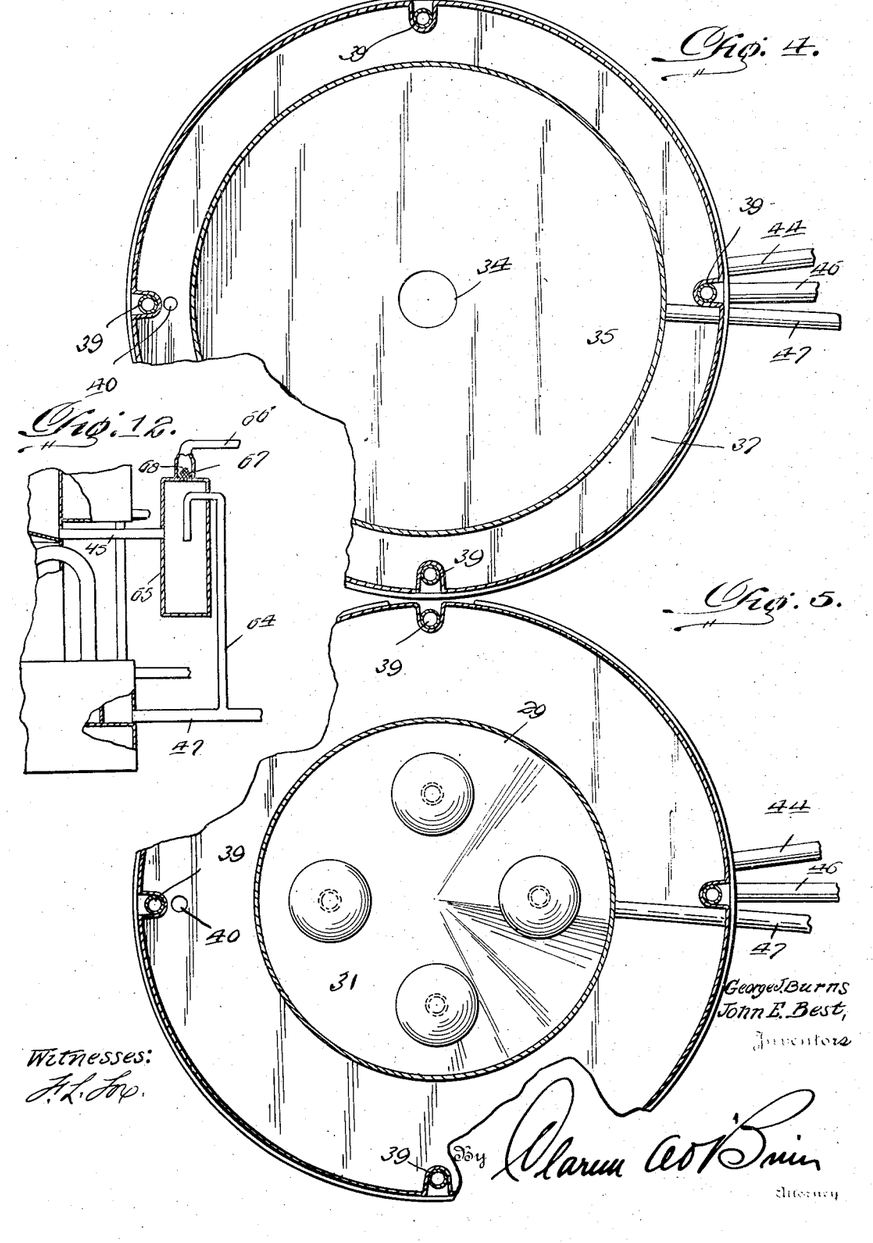
Fig. 4 is a sectional plan view taken on the line 4—4 of Fig. 1.
Fig. 5 is a sectional plan view taken on the line 5—5 of Fig. 1.
Fig. 12 is a sectional side elevation with parts of the recovery tower broken away showing the arrangement of the collection and condensing chamber with respect to the recovery tower.

The gases having been relieved of this fraction pass up through the chamber 28, strike the dome shaped baffles 32 where the second fraction containing the low boiling lighter hydrocarbons in a partially condensed and uncondensed state are separated or deposited from the ascending gas stream and fall upon the inclined roof 31, and flow through the outlet pipe 45 into the collection chamber 65, where the low boiling light hydrocarbon liquid is condensed and collected. Any traces of the gas that may be left in the chamber 65 after the condensation pass up through the outlet 67 through the pipe 66, and are conducted into the suction pipe of the carburetor, due to the suction of the motor, where they are mixed with the incoming air and gasoline. (Figs. 11 and 12). The low boiling light hydrocarbon liquid is conducted through the pipes 64 and 47, respectively, into the manifold as desired, this feed being dependent upon the pressure in the system. This liquid is of a light amber color and has a pungent odor. It has a low boiling point and is readily volatlized.

The gases having been relieved of their liquid and volatile constituents pass up through the lower section 35, then through the upper section 36 of the distributor 34. If the pressure becomes too great in this device, the pressure unseats the valve 38 and allows the gases to escape. If the pressure does not become sufficient to unseat the valve, these gases pass through the top section of the distributor 34, through the pipes 39, into the chamber 24, through the outlet pipe 47 and into the manifold 52. (Fig. 11).

Another feature of our device is the fact that as the exhaust gases pass up through the device, gasoline flows in counter current to the ascending gas, thereby utilizing the gasoline as a medium for extracting heat from the inrushing gases at the point where they are the hottest, and cooling the exhaust gas (at the end of its travel). In other words, the heat exchange principle is utilized and we have found it to make the operation of the device much more efficient. The operation of this feature is as follows:

Gasoline flows through the inlet pipe 44 into the chamber 37, down through the pipe 40, into the chamber 27, then through the pipe 42 into the chamber 6 of the fume arrester 1, and then through the outlet pipe 21 into the suction pipe 51 of the carburetor.

The gases that are emitted from the device due to the excess pressure developing within same, thereby causing the blow-off valve to open, are entirely free from noxious and poisonous concomitants. Actual tests conducted in our laboratory have demonstrated this fact since we have run an automobile equipped with our device in our laboratory for 14 hour stretches, and have never experienced and disastrous results. The gas that is emitted is absolutely harmless and non-poisonous.

Having described our invention, what we desire to secure by Letters Patent is set forth in the claims appended herewith.

Claims:

1. A device of the class described which comprises means for removing carbon from the exhaust gases, means for separating the heavy hydrocarbon liquid from said gases, means for separating the light hydrocarbon liquid from said gases, means for further purifying said gases, means for introducing motor fuel into the device at a point near the top, and means for permitting circulation of said motor fuel in the device out of contact with exhaust gases.

2. In a device of the class described, a recovery tower in combination with a fume arrester, said fume arrester comprising a closed shell having mounted therein a vertical tube surrounded by another vertical tube with a closed top, and a closed cylindrical chamber surounding the said shell provided with an inlet and an outlet for permitting a liquid to flow therethrough, the sides of the vertical tubes having perforations formed therein.

3. In a device of the class described a recovery tower comprising a base chamber, an intermediate chamber partly submerged in and extending vertically upward from said chamber, and a top chamber partly surrounding and extending vertically upward from said intermediate chamber, a distributing head protruding from said intermediate chamber up through the top chamber and terminating at a point above the last mentioned chamber, means for introducing the exhaust gases into the base chamber, means for conveying the gases from the base chamber into the intermediate chamber, baffles within the last named chamber, means for conveying the gases from the distributing head to the base chamber, means for conveying the heavy liquid hydrocarbons from the intermediate chamber, and means for conveying the light liquid hydrocarbons from the intermediate chamber, in combination with a fume arrester.

4. In a device according to claim 3, in which the intermediate chamber has an inclined shelf mounted at a point slightly above the bottom of said chamber, and a triangular shelf mounted at a point substantially spaced from the top of said chamber.

5. In a device of the class described, a recovery tower comprising a base chamber, an intermediate chamber partly submerged in and extending vertically upwardly from said chamber, and a top chamber partly surrounding and extending vertically upwardly from said intermediate chamber, a distributing head protruding from said intermediate chamber, up through the top chamber and terminating at a point above the last mentioned chamber, means for introducing the exhaust gases into the base chamber, means for conveying gases from the base chamber into the intermediate chamber, baffles within the last named chamber, means for conveying the gases from the distributing head to the base chamber, means for conveying the heavy liquid hydro-carbon from the intermediate chamber, and means for conveying the light liquid hydro-carbon from the intermediate chamber in combination with a fume arrester, said intermediate chamber having an inclined shelf mounted at a point slightly above the bottom of said chamber, a triangular shelf mounted at a point substantially spaced from the top of said chamber, and a plurality of umbrella-shaped baffles mounted on the triangular shelf.

6. In a device of the class described, a recovery tower comprising a base chamber, an intermediate chamber partly submerged in and extending vertically upwardly from said chamber, and a top chamber partly surrounding and extending vertically upwardly from said intermediate chamber, a distributing head protruding from said intermediate chamber, up through the top chamber and terminating at a point above the last mentioned chamber, means for introducing the exhaust gases into the base chamber, means for conveying gases from the base chamber into the intermediate chamber, baffles within the last named chamber, means for conveying the gases from the distributing head to the base chamber, means for conveying the heavy liquid hydro-carbon from the intermediate chamber, means for conveying the light liquid hydro-carbon from the intermediate chamber in combination with a fume arrester, said intermediate chamber having an inclined shelf mounted at a point slightly above the bottom of said chamber, a triangular shelf mounted at a point substantially spaced from the top of said chamber, and a plurality of V-shaped inlet tubes mounted in the intermediate chamber.

7. In a device according to claim 3, in which the base and top chambers are of the same diameter, and the intermediate chamber is of smaller diameter.

8. In a device as set forth in claim 3, in which the distributing head comprises two converging sections mounted in a vertical line and spaced apart.

9. In a device of the class described, a recovery tower comprising a base chamber, an intermediate chamber partly submerged in and extending vertically upward from said chamber, and a top chamber partly surrounding and extending vertically upward from said intermediate chamber, a distributing head protruding from said intermediate chamber up through the top chamber and terminating at a point above the last mentioned chamber, means for introducing the exhaust gases into the base chamber, means for conveying the gases from the base chamber into the intermediate chamber, baffles within the last named chamber, means for conveying the gases from the distributing head to the base chamber, means for conveying the heavy liquid hydrocarbons from the intermediate chamber, and means for conveying the light liquid hydrocarbons from the intermediate chamber in combination with a fume arrester, said distributing head comprising two converging sections mounted in a vertical line and spaced apart, the upper converging section of the distributing head being formed of a plurality of branches.

10. In a device of the class described, a recovery tower comprising a base chamber, an intermediate chamber partly submerged in and extending vertically upward from said chamber, and a top chamber partly surrounding and extending vertically upward from said intermediate chamber, a distributing head protruding from said intermediate chamber up through the top chamber and terminating at a point above the last mentioned chamber, means for introducing the exhaust gases into the base chamber, means for conveying the gases from the base chamber into the intermediate chamber, baffles within the last named chamber, means for conveying the gases from the distributing head to the base chamber, means for conveying the heavy liquid hydrocarbons from the intermediate chamber, and means for conveying the liquid hydrocarbons from the intermediate chamber, in combination with a fume arrester, said distributing head comprising two converging sections mounted in a vertical line and spaced apart, the lower converging section of said distributing head being of a flat drum shape.

11. In a device of the class described a recovery tower comprising a base chamber, a top chamber, and an intermediate chamber interposed therebetween, a distributing head communicating with said intermediate and top chambers and terminating without and at a point spaced above said top chamber, in combination with a fume arrester connected to the base chamber, means for admitting exhaust gases into said fume arrester and recovery tower, means for introducing motor fuel into the top chamber, means for circulating motor fuel from the top to the bottom chambers out of contact with exhaust gases, and means for permitting a circulation of motor fuel in fume arrester out of contact with exhaust gases.

12. In a device according to claim 11, in which a non-communicating chamber surrounds the upper part of the base chamber.

13. In a device according to claim 11, in which a non-communicating cylindrical chamber surrounds the fume arrester.

14. In a device of the class described, a recovery tower comprising a base chamber, a top chamber, and an intermediate chamber interposed therebetween, means for controlling the discharge of gas from the top chamber of said tower, and means for eliminating the poisonous constituents from said gas before discharge into the atmosphere, and an absorption chamber surrounding the discharge means.

In testimony whereof we affix our signatures.

GEORGE J. BURNS.
JOHN E. BEST.